US012001156B2

(12) United States Patent
Park et al.

(10) Patent No.: US 12,001,156 B2
(45) Date of Patent: Jun. 4, 2024

(54) DEVELOPING DEVICE WITH MAGNETIC MEMBER HAVING PLURALITY OF MAGNETIC POLES

(71) Applicant: Hewlett-Packard Development Company, L.P., Spring, TX (US)

(72) Inventors: Seungchan Park, Seongnam-si (KR); Jungho Roh, Seongnam-si (KR); Myeongdong Kim, Seongnam-si (KR); Donguk Kim, Seongnam-si (KR); Youngkwang Shin, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/023,977

(22) PCT Filed: Dec. 15, 2020

(86) PCT No.: PCT/US2020/064990
§ 371 (c)(1),
(2) Date: Feb. 28, 2023

(87) PCT Pub. No.: WO2022/050971
PCT Pub. Date: Mar. 10, 2022

(65) Prior Publication Data

US 2024/0027938 A1 Jan. 25, 2024

(30) Foreign Application Priority Data

Sep. 1, 2020 (KR) ........................ 10-2020-0110791

(51) Int. Cl.
*G03G 15/09* (2006.01)
*G03G 15/08* (2006.01)

(52) U.S. Cl.
CPC ..... *G03G 15/0928* (2013.01); *G03G 15/0818* (2013.01)

(58) Field of Classification Search
CPC ........... G03G 15/0928; G03G 15/0921; G03G 15/0818; G03G 2215/0609
See application file for complete search history.

(56) References Cited

U.S. PATENT DOCUMENTS 6,718,153 B2 4/2004 Nishimura et al.
7,647,001 B2 1/2010 Kotera et al.
(Continued)

FOREIGN PATENT DOCUMENTS

JP 2000-162875 A 6/2000
JP 2006-126545 A 5/2006
(Continued)

*Primary Examiner* — Sandra Brase
(74) *Attorney, Agent, or Firm* — Foley & Lardner LLP

(57) ABSTRACT

In some examples, a developing device includes a developing container including an opening and to store a developer, a developing sleeve installed in the developing container and partially exposed to an outside of the developing container through the opening, a regulation member upstream of the opening in a rotation direction of the developing sleeve and to regulate an amount of the developer adhered to the developing sleeve and supplied to the opening, and a magnetic member inside the developing sleeve. The magnetic member includes a main pole facing the opening, a regulation pole facing the regulation member, and a catch pole upstream of the regulation pole in the rotation direction of the developing sleeve. The magnetic member is to cause adhesion of the developer in the developing container to the developing sleeve. At least one of lengths of the catch pole or the regulation pole and diameters of both end portions of the catch pole or the regulation pole are less than a length and a diameter, respectively, of the main pole.

14 Claims, 7 Drawing Sheets

(56) References Cited

U.S. PATENT DOCUMENTS

| | | | | |
|---|---|---|---|---|
| 9,031,472 | B2 | 5/2015 | Yotsutsuji et al. | |
| 2003/0103783 | A1* | 6/2003 | Nishimura ......... | G03G 15/0921 399/277 |
| 2006/0093406 | A1 | 5/2006 | Miyasaka et al. | |
| 2006/0204283 | A1 | 9/2006 | Yasuda | |
| 2008/0304873 | A1* | 12/2008 | Shin .................. | G03G 15/0928 399/277 |
| 2012/0201577 | A1* | 8/2012 | Sakamaki .......... | G03G 15/0921 399/286 |
| 2015/0037074 | A1 | 2/2015 | Lee et al. | |
| 2015/0086247 | A1 | 3/2015 | Yoshimoto | |
| 2019/0187589 | A1 | 6/2019 | Shima et al. | |

FOREIGN PATENT DOCUMENTS

| | | | |
|---|---|---|---|
| JP | 2006-251440 | A | 9/2006 |
| JP | 2010-134138 | A | 6/2010 |
| JP | 2019-105800 | A | 6/2019 |

* cited by examiner

DEVELOPING DEVICE WITH MAGNETIC MEMBER HAVING PLURALITY OF MAGNETIC POLES

CROSS-REFERENCE TO RELATED APPLICATIONS

This application is filed under 35 U.S.C. § 371 as a National Stage of PCT International Application No. PCT/US2020/064990, filed Dec. 15, 2020, which claims priority to Korean Patent Application No. 10-2020-0110791, filed Sep. 1, 2020, which are incorporated by reference herein in their entireties.

BACKGROUND

An electrophotographic image forming apparatus supplies a toner to an electrostatic latent image formed on a photoconductor to form a visible toner image on the photoconductor, transfers the toner image to a print medium, and then fixes the transferred toner image to the print medium, thereby printing an image on the print medium. A developer is stored in a developing device. The developer includes a toner and a carrier. The developer stored in the developing device is adhered to the outer circumference of a developing sleeve by a magnetic force. From the developer adhered to the outer circumference of the developing sleeve, the toner is supplied to the electrostatic latent image formed on the photoconductor, thereby forming a visible toner image on the photoconductor.

DETAILED DESCRIPTION OF EXAMPLES

Figure 1:
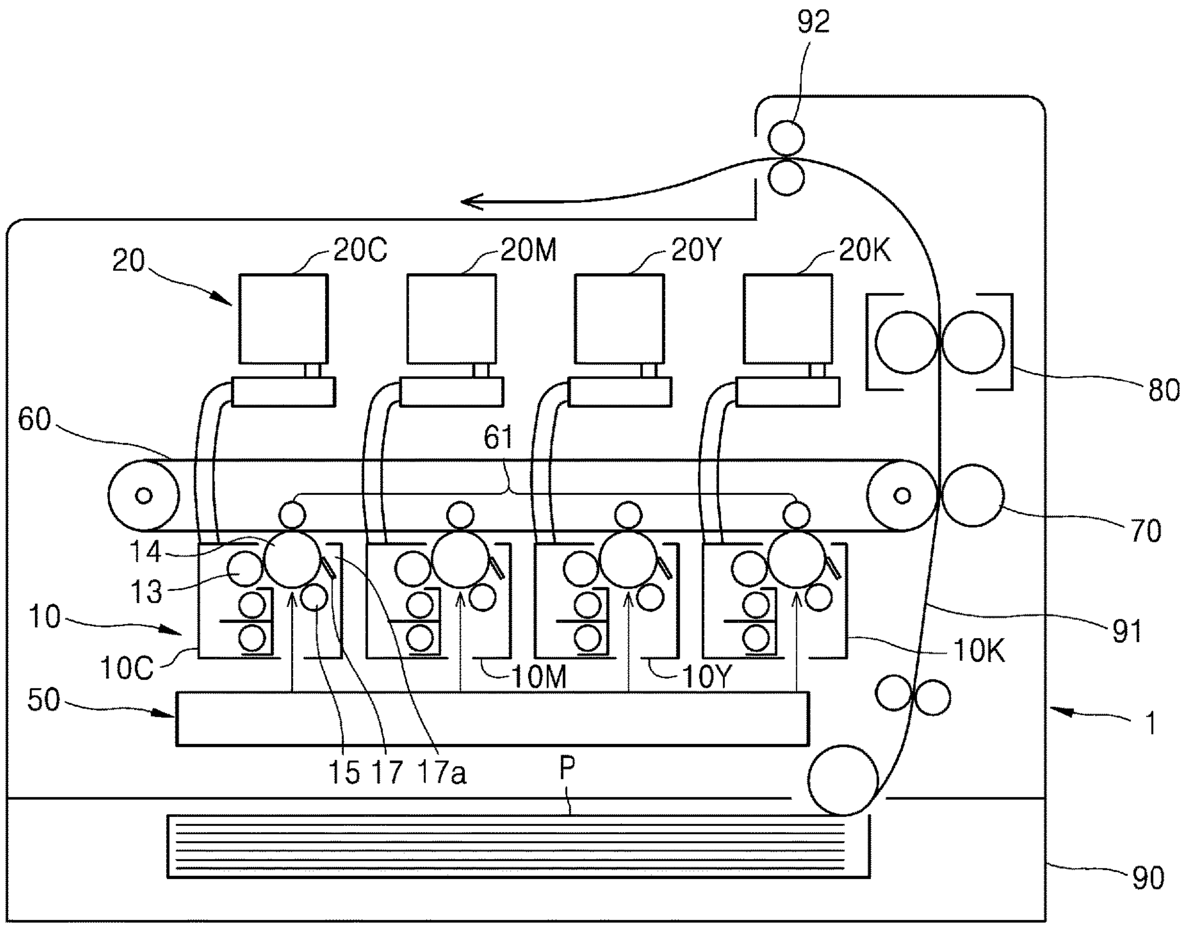
FIG. 1 is a schematic view of an electrophotographic image forming apparatus according to an example.

An electrophotographic image forming apparatus employing a two-component developing method uses a toner and a carrier as a developer. The developer is accommodated in a developing device. The developer in the developing device is adhered to an outer circumference of the developing roller, and the developing roller supplies the toner from the developer to a photoconductor. The developer is adhered to the developing roller by a magnetic force. The developing roller includes a developing sleeve and a magnetic member that is located inside the developing sleeve, and the magnetic member provides a magnetic force to adhere the developer to the outer circumference of the developing sleeve. The magnetic member includes a plurality of magnetic poles arranged in a direction of rotation of the developing sleeve. The magnetic force provided by the plurality of magnetic poles are uniform in the lengthwise direction, that is, the axial direction. In general, the magnetic force of both end portions of the plurality of magnetic poles in the lengthwise direction is stronger than that of the center portions of the plurality of magnetic poles. As a result, the density of the developer becomes higher at the both end portions of the developing sleeve than at the center portion of the developing sleeve. In order to develop the toner from a surface of the developing sleeve to the photoconductor, an alternating voltage is applied between the developing sleeve and the photoconductor. In a portion with a high density of the developer, a strong voltage is applied between the developing sleeve and the photoconductor, and thus a surface of the photoconductor may be worn. When the surface of the photoconductor is worn off, carriers may be adhered thereto. Carriers adhered to the surface of the photoconductor may wear a cleaning blade that cleans the surface of the photoconductor and may adhere to a charging roller to contaminate the charging roller.

In a developing device of an example, a plurality of magnetic poles may include a catch pole configured to adhere a developer within the developing device to the developing sleeve, a regulation pole configured to face a regulation member and regulate an amount of the developer adhered to the outer circumference of the developing sleeve, and a main pole configured to face the photoconductor. At least one of lengths of the catch pole and the regulation pole in a lengthwise direction and diameters of both end portions of the catch pole and the regulation pole are less than each of a length and a diameter, respectively, of the main pole. According to this configuration, the magnetic force of both end portions of the catch pole and the regulation pole in the lengthwise direction may be reduced, thereby preventing excessive adhesion of the developer to both end portions of the developing sleeve in the lengthwise direction. Hereinafter, examples of a developing device and an electrophotographic image forming apparatus employing the developing device will be described in detail with reference to the accompanying drawings. In addition, in the present specification and drawings, components having substantially the same functional configuration will be denoted as the same reference numerals.

FIG. 1 is a schematic view of an electrophotographic image forming apparatus according to an example. Referring to FIG. 1, an image forming apparatus of an example includes a developing device 10 configured to form a visible toner image by supplying a developer to an electrostatic latent image formed on a photoconductor 14. The image forming apparatus includes a transfer device configured to transfer the toner image to a print medium P, and a fixing device 80 configured to fix the toner image onto the print medium P.

The image forming apparatus of this example prints a color image through electrophotography. Referring to FIG. 1, the image forming apparatus may include a plurality of developing devices 10, an exposure device 50, a transfer device, and a fixing device 80. The developing device 10 may be an integrated developing device including a developing roller 13 and a photoconductor 14. The developing device 10 may include a developing unit including the developing roller 13 and a photosensitive unit including the photoconductor 14. The developing unit and the photosensitive unit may be replaced individually.

The image forming apparatus may further include a plurality of developer cartridges 20 storing respective developers. The plurality of developer cartridges 20 are connected to the plurality of developing devices 10, respectively, and the developers stored in the plurality of developer cartridges 20 are supplied to the plurality of developing devices 10, respectively. For example, the plurality of developing devices 10 may include a plurality of developing devices 10C, 10M, 10Y, and 10K to form cyan, magenta, yellow, and black toner images. The plurality of developer cartridges 20 may include a plurality of developer cartridges 20C, 20M, 20Y, and 20K storing cyan, magenta, yellow, and black developers, respectively. When a developer stored in a developer cartridge 20 is exhausted, the developer cartridge 20 may be replaced with a new developer cartridge 20 or the developer cartridge 20 may be re-filled with a new developer.

The photoconductor 14 may be an example of a photosensitive member having a surface on which an electrostatic latent image is formed. The photoconductor 14 may be in the form of a photosensitive drum that includes a conductive metal pipe and a photosensitive layer formed on the outer circumference of the conductive metal pipe. A charging roller 15 is an example of a charger for charging the photoconductor 14 to have a uniform surface electric potential. Instead of the charging roller 15, a charging brush or a corona charger may be employed. A cleaning member 17 removes the developer remaining on the surface of the photoconductor 14 after an intermediate transfer process described below. The cleaning member 17 may be, for example, a cleaning blade that comes into contact with the surface of the photoconductor 14 to scrape off the residual developer. A waste developer removed from the surface of the photoconductor 14 may be stored in a waste developer container 17*a*.

The exposure device 50 can irradiate a plurality of light beams modulated according to corresponding color information of respective colors onto the respective photoconductors 14 of the plurality of developing devices 10C, 10M, 10Y, and 10K, thereby forming electrostatic latent images on the photoconductors 14. A developing bias voltage to develop toner to a corresponding photoconductor 14 may be applied to the developing roller 13 of each of the plurality of developing devices 10C, 10M, and 10K. Therefore, visible toner images are formed on the surfaces of the plurality of photoconductors 14. The transfer device transfers toner images formed on the plurality of photoconductors 14 onto the print medium P. In an example, an intermediate transfer type transfer device may be employed. As an example, the transfer device may include an intermediate transfer belt 60, a plurality of intermediate transfer rollers 61 facing the photoconductors 14 of the plurality of developing devices 10M, 10Y, and 10K to interpose the intermediate transfer belt 60 between the photoconductors 14 and the transfer rollers 61, and a transfer roller 70. In response to an application of an intermediate transfer bias voltage to the plurality of intermediate transfer rollers 61, the toner images developed on the plurality of photoconductors 14 are intermediately transferred to the intermediate transfer belt 60. The transfer roller may face the intermediate transfer belt 60. The print medium P loaded on a paper feeding unit 90 is conveyed along a paper feeding path 91 and fed between the transfer roller 70 and the intermediate transfer belt 60. The toner images intermediately transferred onto the intermediate transfer belt 60 are transferred onto the print medium P by a transfer bias voltage applied to the transfer roller 70. When the print medium P passes through the fixing device 80, the toner images are fixed to the print medium P by heat and pressure. The print medium P onto which the toner images are fixed is discharged by a discharge roller 92.

Figure 2:
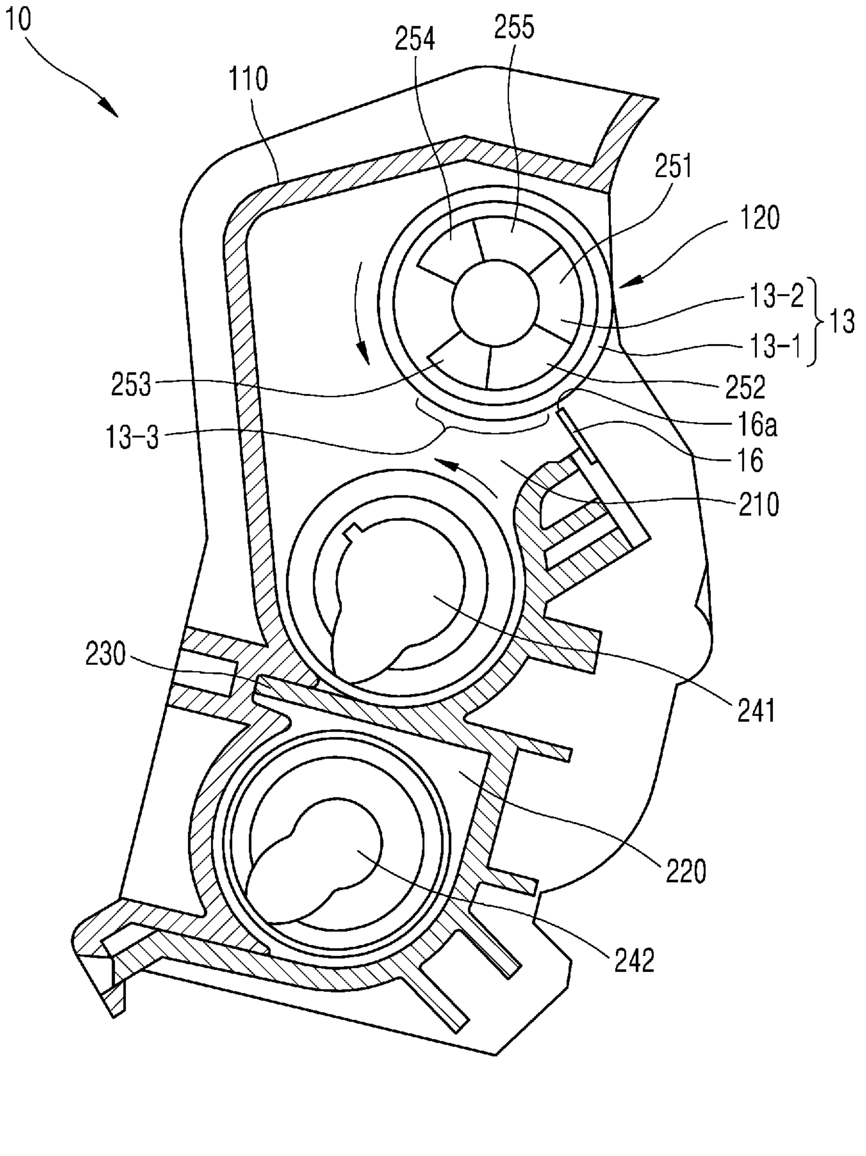
FIG. 2 is a schematic cross-sectional view of a developing device according to the example shown in FIG. 1.

FIG. 2 is a schematic cross-sectional view of the developing device 10 according to an example. Referring to FIG. 2, the developing device 10 includes a developing container 110 that stores a developer and includes an opening 120, a developing sleeve 13-1 that is partially exposed to the outside of the developing container 110 through the opening 120, a regulation member 16 that is located at the upstream side of the opening 120 in the direction of rotation of the developing sleeve 13-1 (as indicated by the arrow to the left of the developing sleeve 13-1) and regulates an amount of the developer adhered to the developing sleeve 13-1 and supplied to the opening 120, and a magnetic member 13-2 located at the inner side of the developing sleeve 13-1. The magnetic member 13-2 includes a main pole 251 that faces the opening 120, a regulation pole 252 that faces the regulation member 16, and a catch pole 253 that is located at the upstream side of the regulation pole 252 in the direction of rotation of the developing sleeve 13-1. The magnetic member 13-2 causes adhesion of the developer in the developing container 110 to the developing sleeve 13-1. At least one of the following is applicable: lengths of the catch pole 253 and the regulation pole 252 are less than a length of the main pole 251; or diameters of both end portions of the catch pole 253 and the regulation pole 252 are less than a diameter of the main pole 251.

Referring to FIG. 2, the developing device 10 includes the developing container 110. The developing container 110 stores the developer. The opening 120 is provided in the developing container 110. The developing sleeve 13-1 is rotatably installed at the developing container 110. The developing sleeve 13-1 is partially exposed to the outside of the developing container 110 through the opening 120. An exposed portion of the developing sleeve 13-1 faces the photoconductor 14. The developing sleeve 13-1 is located apart from the photoconductor 14. A distance between the outer circumference of the developing sleeve 13-1 and the outer circumference of the photoconductor 14 may be, for example, from about tens of microns to hundreds of microns. The magnetic member 13-2 that provides the magnetic force to adhere the developer to the developing sleeve 13-1 is installed inside the developing sleeve 13-1. The magnetic member 13-2 is not rotated.

In an example, the developing container 110 may include a developing chamber 210 and an agitating chamber 220. The opening 120 is formed in the developing chamber 210 to be opened toward the photoconductor 14. The developing sleeve 13-1 is installed in the developing chamber 210. The agitating chamber 220 is separated from the developing chamber 210 by a partitioning wall 230. The developing chamber 210 and the agitating chamber 220 communicate with each other through communication holes provided in the partitioning wall 230 in the lengthwise direction, that is, both end portions in the axial direction of the developing sleeve 13-1. A first transporting member 241 and a second transporting member 242 may be provided in the developing chamber 210 and the agitating chamber 220, respectively. The first and second transporting members 241 and 242 agitate the toner and the carrier while transporting the developer inside the developing chamber 210 and the agitating chamber 220 in opposite lengthwise directions, respectively. Due to this configuration, the developer is circulated along a circulation path formed through the developing chamber 210, a communication hole (not shown), the agitating chamber 220, another communication hole (not shown), and the developing chamber 210. The developer transported within the developing chamber 210 is partially adhered to the developing sleeve 13-1 by the magnetic force of the magnetic member 13-2, and the toner of the developer is supplied to the photoconductor 14 through the opening 120.

The regulation member 16 is located at the upstream side of the opening 120 in the direction of rotation of the developing sleeve 13-1. An end portion 16*a* of the regulation member 16 is spaced apart from the outer circumference of the developing sleeve 13-1 to form a regulation gap. Due to the regulation gap, an amount of developer that is adhered to the developing sleeve 13-1 and delivered to the opening 120 as the developing sleeve 13-1 is rotated is regulated.

The magnetic member 13-2 may include a plurality of magnetic poles. The plurality of magnetic poles is arranged in the direction of rotation of the developing sleeve 13-1. The plurality of magnetic poles may include the main pole 251 that faces the opening 120, the regulation pole 252 that faces the regulation member 16, and the catch pole 253 that is located at the upstream side of the regulation pole 252 in the direction of rotation of the developing sleeve 13-1. The catch pole 253 adheres the developer in the developing container 110, e.g., the developing chamber 210, to the developing sleeve 13-1. The plurality of magnetic poles may further include a feed pole 255 and a separation pole 254, which are sequentially located at the downstream side of the main pole 251 in the direction of rotation of the developing sleeve 13-1. According to this configuration, the feed pole 255, the separation pole 254, the catch pole 253, and the regulation pole 252 may be arranged from the main pole 251 in the order stated in the direction of rotation of the developing sleeve 13-1. The magnetic polarity of the separation pole 254 and the catch pole 253 may be the same. In an example, the magnetic polarity of the separation pole 254, the catch pole 253, and the main pole 251 is S pole, and the magnetic polarity of the feed pole 255 and the regulation pole 252 is N pole.

A developer layer of the developer adhered to the outer circumference of the developing sleeve 13-1 by the magnetic force of the catch pole 253 is transported to the regulation pole 252 as the developing sleeve 13-1 is rotated. The thickness of the developer is regulated as the developer layer passes between the developing sleeve 13-1 and the regulation member 16, and thus the developer layer has a uniform thickness. The developer layer regulated to the uniform thickness is transported to the main pole 251 as the developing sleeve 13-1 is rotated. The toner is adhered from the developer layer on the surface of the developing sleeve 13-1 to an electrostatic latent image formed on the surface of the photoconductor 14 by a developing bias voltage applied to the developing sleeve 13-1. The developer remaining on the outer circumference of the developing sleeve 13-1 after passing through the main pole 251 is transported to the separation pole 254 through the feed pole 255. At the separation pole 254, the developer is separated from the outer circumference of the developing sleeve 13-1 by a repulsive magnetic field formed by the separation pole 254 and the catch pole 253 and falls into the developing chamber 210. Due to such a circulation arrangement, a developer that includes a new toner can be supplied to the developing sleeve 13-1.

The magnetic member 13-2 in an example has a diameter and a partial arc shape having a length in the axial direction. The strength of the magnetic force of the magnetic member 13-2 is uniform in the axial direction, that is, the lengthwise direction. However, in the case of the magnetic member 13-2 manufactured through a general magnetization process, the magnetic force of both end portions is stronger than that of the center portion in the lengthwise direction. In this case, the amount of developer adhered to both end portions of the developing sleeve 13-1 is greater than the amount of developer adhered to the center portion. Although the thickness of the developer layer transported to the opening 120 is regulated by the regulation member 16, the developer layer adhered to the outer circumference of the developing sleeve 13-1 is denser in both end portions than in the center portion. The developing sleeve 13-1 and the photoconductor 14 are located apart from each other, and a developing bias voltage for development is applied therebetween. The developing bias voltage may include an alternating voltage. The carrier in the developer can include iron. The iron in the carrier enables a current to flow between the developing sleeve 13-1 and the photoconductor 14. In a case where the density of the developer at both end portions of the developing sleeve 13-1 is higher than that of the center portion, a high voltage may be applied to both end portions of the developing sleeve 13-1 and photoconductor 14, and thus wear of the end portions of the photoconductor 14 may be accelerated. The surface wear of the photoconductor 14 may cause adhesion of the carrier to the photoconductor 14, wear of the cleaning member 17 during a process of removing the carrier, contamination of the charging roller 15 due to the carrier adhered to the charging roller 15, and contamination of both end portions of the print medium P in the widthwise direction by the toner.

In order to lower the density of the developer at both end portions of the developing sleeve 13-1 in the developing device 10 of some examples, at least one of the lengths of the catch pole 253 and the regulation pole 252 of the magnetic member 13-2 and the diameters of both end portions of the catch pole 253 and the regulation pole 252 are set to be less than the length and the diameter, respectively, of the main pole 251. As the length of a magnetic pole is shortened or the diameters of both end portions of a magnetic pole are reduced, the strength of the magnetic force provided by the magnetic pole is weakened, and thus the amount of the developer adhered to the end portions of the developing sleeve 13-1 may be reduced.

Figure 3:
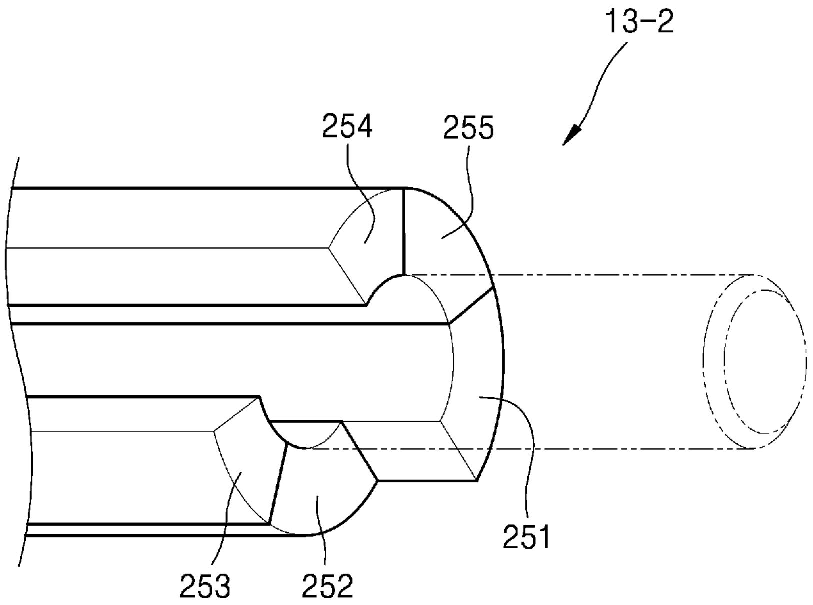
FIG. 3 is a partial perspective view of a magnetic member shown in FIG. 2 according to an example.

FIG. 3 is a partial perspective view of the magnetic member 13-2 according to an example. Referring to FIG. 3, the length of the catch pole 253 is less than the length of the main pole 251. As shown in FIG. 2, in the structure in which the end portion 16*a* of the regulation member 16 that faces the developing sleeve 13-1 is located below the center of the developing sleeve 13-1, both the catch pole 253 and the regulation pole 252 adhere the developer in the developing container 110 (i.e., the developing chamber 210) to the developing sleeve 13-1. In other words, in an adhesion region 13-3 that includes the catch pole 253 and the regulation pole 252, the developer in the developing container 110 is adhered to the developing sleeve 13-1. The length of the regulation pole 252 may also be less than the length of the main pole 251. The lengths of the catch pole 253 and the regulation pole 252 may be the same. The lengths of the main pole 251, the feed pole 255, and the separation pole 254 may be the same. The diameters of the main pole 251, the regulation pole 252, the catch pole 253, the separation pole 254, and the feed pole 255 may be constant in the lengthwise direction. The diameters of the main pole 251, the regulation pole 252, the catch pole 253, the separation pole 254, and the feed pole 255 may be the same.

In a case where the lengths of the catch pole 253 and the regulation pole 252 are less than the length of the main pole 251, the strength of the magnetic force applied to both end portions of the developing sleeve 13-1 is weakened, and thus the amount of the developer adhered to the both end portions of the developing sleeve 13-1 may be reduced. Also, since the strength of the magnetic force of the regulation pole 252 acting on both end portions of the developing sleeve 13-1 is reduced, the developer adhered to both end portions of the developing sleeve 13-1 is spread in the axial direction (i.e., the lengthwise direction) by the regulation member 16 as the developing sleeve 13-1 is rotated, and thus the density of the developer at the both end portions of the developing sleeve 13-1 may be reduced. The density of the developer supplied to the main pole 251 that faces the opening 120 may be similar at the center portion and both end portions of the developing sleeve 13-1 or may be lower at both end portions than at the center portion. Therefore, local wear of both end portions of the photoconductor 14 and contaminations caused by the same, e.g., contamination of the cleaning member 17, contamination of the charging roller 15, contamination of both end portions of the print medium P in the width direction, etc., may be reduced or prevented.

Figure 4:
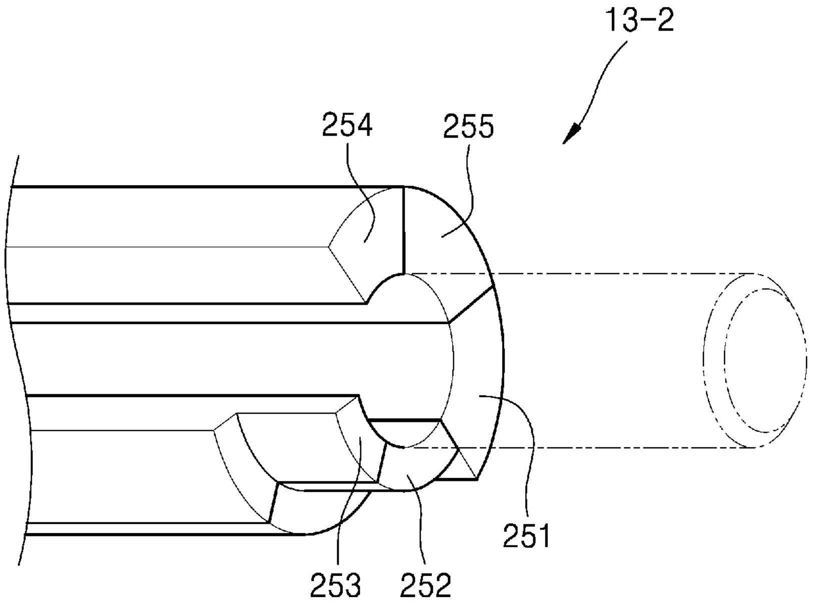
FIG. 4 is a partial perspective view of a magnetic member shown in FIG. 2 according to an example.

FIG. 4 is a partial perspective view of the magnetic member 13-2 according to an example. Referring to FIG. 4, the lengths of the main pole 251, the regulation pole 252, and the catch pole 253 are the same. The diameters of the catch pole 253 and the regulation pole 252 are less at both end portions than at the center portion. The diameters of both end portions of the catch pole 253 and the regulation pole 252 are less than the diameter of the main pole 251. The diameters of the main pole 251, the feed pole 255, and the separation pole 254 may be constant in the lengthwise direction. The lengths of the main pole 251, the separation pole 254, and the feed pole 255 may be the same. By setting the diameters of both end portions of the catch pole 253 and the regulation pole 252 to be less than the diameter of the main pole 251, the amount of the developer adhered to the end portions of the developing sleeve 13-1 in the adhesion region (13-3 in FIG. 2) may be reduced. Also, since the strength of the magnetic force of the regulation pole 252 acting on both end portions of the developing sleeve 13-1 is reduced, the developer adhered to both end portions of the developing sleeve 13-1 is spread in the axial direction (i.e., the lengthwise direction) by the regulation member 16 as the developing sleeve 13-1 is rotated, and thus the density of the developer at both end portions of the developing sleeve 13-1 may be reduced.

Figure 5:
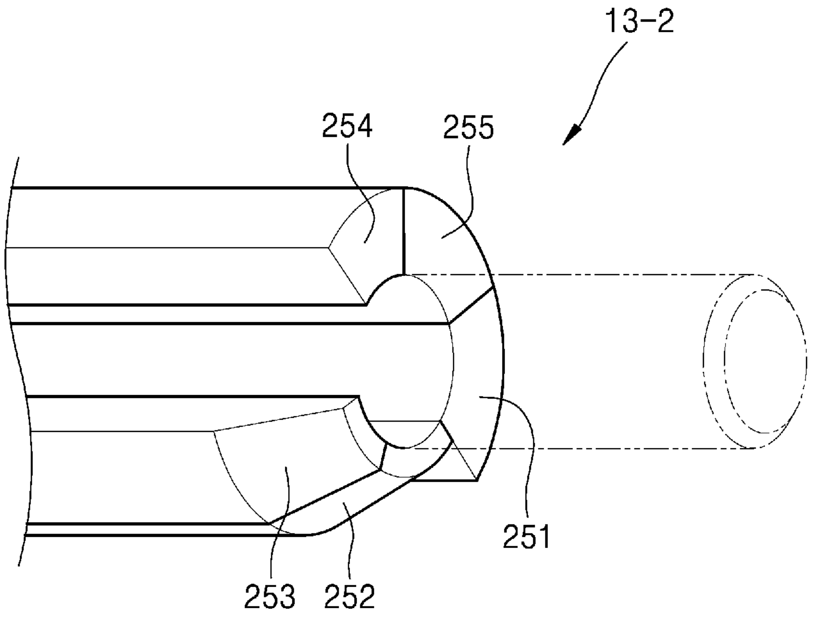
FIG. 5 is a partial perspective view of a magnetic member shown in FIG. 2 according to an example.

FIG. 5 is a partial perspective view of the magnetic member 13-2 according to an example. Referring to FIG. 5, the lengths of the main pole 251, the regulation pole 252, and the catch pole 253 may be the same or the lengths of the regulation pole 252 and the catch pole 253 may be less than the length of the main pole 251. Both end portions of the catch pole 253 and the regulation pole 252 have a shape in which diameters gradually decrease. Such a shape may be formed, for example, by chamfering or rounding the end portions of the catch pole 253 and the regulation pole 252. The diameters of the main pole 251, the feed pole 255, and the separation pole 254 may be constant in the lengthwise direction. The lengths of the main pole 251, the separation pole 254, and the feed pole 255 may be the same. By chamfering both end portions of the catch pole 253 and the regulation pole 252, the amount of the developer adhered to both end portions of the developing sleeve 13-1 in the adhesion region (13-3 in FIG. 2) may be reduced. Also, since the strength of the magnetic force of the regulation pole 252 acting on both end portions of the developing sleeve 13-1 is reduced, the developer adhered to both end portions of the developing sleeve 13-1 is spread in the axial direction (i.e., the lengthwise direction) by the regulation member 16 as the developing sleeve 13-1 is rotated, and thus the density of the developer at both end portions of the developing sleeve 13-1 may be reduced.

Figure 6:
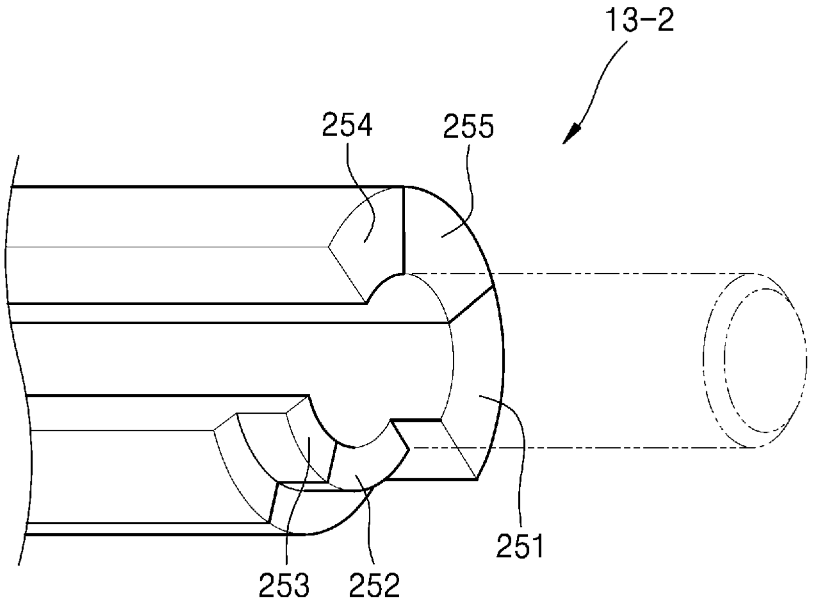
FIG. 6 is a partial perspective view of a magnetic member shown in FIG. 2 according to an example.

FIG. 6 is a partial perspective view of the magnetic member 13-2 according to an example. This example is a combination of the examples shown in FIGS. 3 and 4. Referring to FIG. 6, the lengths of the catch pole 253 and the regulation pole 252 are less than the length of the main pole 251. The lengths of the catch pole 253 and the regulation pole 252 may be the same. The diameters of the catch pole 253 and the regulation pole 252 are less at both end portions than at the center portion. The diameters of both end portions of the catch pole 253 and the regulation pole 252 are less than the diameter of the main pole 251. The lengths of the main pole 251, the feed pole 255, and the separation pole 254 may be the same. The diameters of the main pole 251, the feed pole 255, and the separation pole 254 may be constant in the lengthwise direction. Due to the configuration of FIG. 6, the amount of the developer adhered to both end portions of the developing sleeve 13-1 in the adhesion region (13-3 in FIG. 2) may be reduced. Also, since the strength of the magnetic force of the regulation pole 252 acting on both end portions of the developing sleeve 13-1 is reduced, the developer adhered to both end portions of the developing sleeve 13-1 is spread in the axial direction (i.e., the lengthwise direction) by the regulation member 16 as the developing sleeve 13-1 is rotated, and thus the density of the developer at both end portions of the developing sleeve 13-1 may be reduced.

Figure 7:
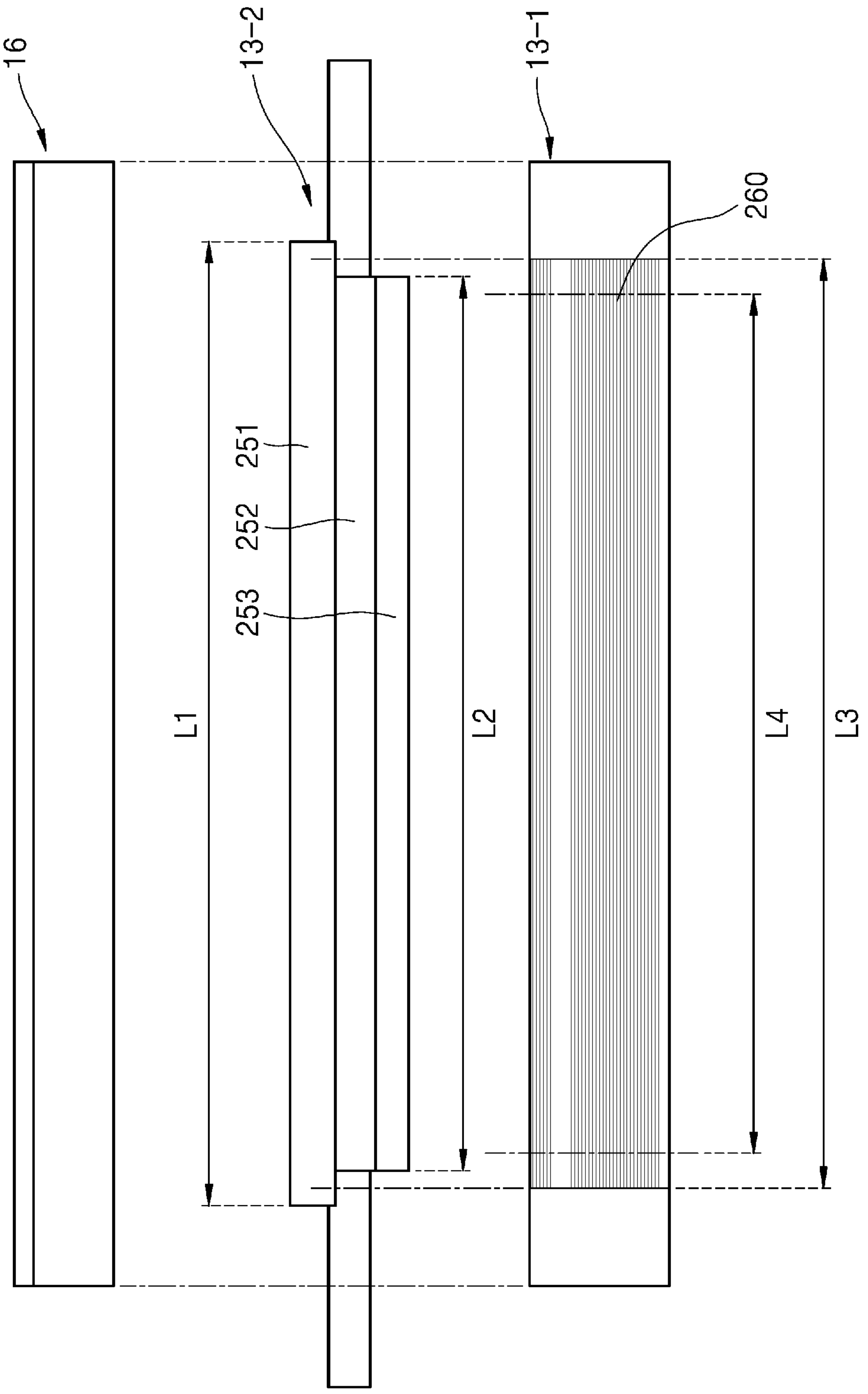
FIG. 7 is a plan view showing a relationship between the length of a developing sleeve and the length of a magnetic pole of a magnetic member, according to an example.

FIG. 7 is a plan view showing a relationship between the length of the developing sleeve 13-1 and the length of the magnetic member 13-2 (the lengths extend in lengthwise directions). Referring to FIG. 7, a concave-convex pattern 260 may be formed on the surface of the developing sleeve 13-1 to improve the adhesion efficiency of the developer. The concave-convex pattern 260 may include a plurality of V-shaped grooves extending in the lengthwise direction. The concave-convex pattern 260 may be formed by forming roughness on the surface of the developing sleeve 13-1 through a sand blasting process, for example. A length L3 of the concave-convex pattern 260 may be greater than a maximum width L4 of the print medium P used in an image forming apparatus. A length L1 of the main pole 251 may be greater than or equal to the length L3 of the concave-convex pattern 260.

When a length L2 of the catch pole 253 and the regulation pole 252 is less than the length L1 of the main pole 251 (FIGS. 3 and 6), the length L2 of the catch pole 253 and the regulation pole 252 is less than the length L3 of the concave-convex pattern 260. Therefore, the density of the developer adhered to both end portions of the concave-convex pattern 260 may be reduced, thereby reducing or preventing local wear of the photoconductor 14. In a case where the length L2 of the catch pole 253 and the regulation pole 252 is less than the maximum width L4 of the print medium P used in the image forming apparatus, an image density of one end portion of a printed image may be lowered in a case where the print medium P is skewed to one side during a feeding process. In view of this, the length L2 of the catch pole 253 and the regulation pole 252 may be greater than or equal to the maximum width L4 of the print medium P used in the image forming apparatus. For the same reason, in a case where the length L2 of the catch pole 253 and the regulation pole 252 is the same as the length L1 of the main pole 251 and the diameters of both end portions of the catch pole 253 and the regulation pole 252 are less than the diameter of the main pole 251 (FIGS. 4 and 6) and a case where the both end portions of the catch pole 253 and the regulation pole 252 are chamfered and have shapes in which the diameters of the both end portions decrease (FIG. 6), the lengths of the catch pole 253 and the regulation pole 252 excluding portions with decreased diameters are less than the length L3 of the concave-convex pattern 260 and are equal to or greater than the maximum width L4 of the print medium P used in the image forming apparatus.

Figure 8:
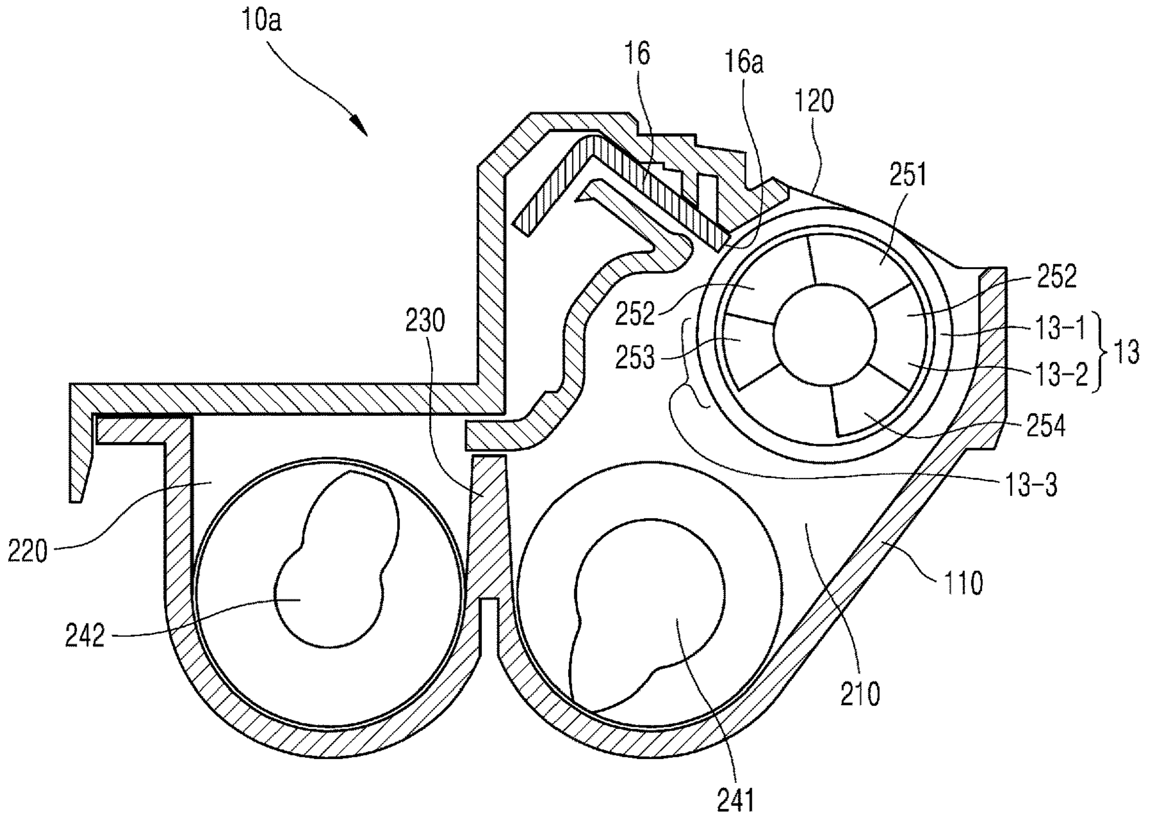
FIG. 8 is a schematic cross-sectional view of a developing device, according to an example.

FIG. 8 is a schematic cross-sectional view of a developing device 10*a*. Hereinafter, members that have the same function are denoted by the same reference numerals, descriptions identical to those already given above will be omitted, and descriptions will be given mainly for differences from the developing device 10 shown in FIG. 2. Referring to FIG. 8, unlike the developing device 10 shown in FIG. 2, in the developing device 10*a* of this example, the agitating chamber 220 and the developing chamber 210 are arranged side by side in the transverse direction (that is perpendicular to the lengthwise direction), and the end portion 16*a* of the regulation member 16 that faces the developing sleeve 13-1 and forms a regulation gap is located above the center of the developing sleeve 13-1. In the arrangement of FIG. 8, the catch pole 253 causes adhesion of the developer inside the developing container 110 (i.e., the developing chamber 210) to the developing sleeve 13-1, and the developer adhered to the developing sleeve 13-1 is transported to the regulation pole 252 as the developing sleeve 13-1 is rotated. Therefore, the regulation pole 252 is not included in the adhesion region 13-3. In a case where the magnetic strength of both end portions of both the catch pole 253 and the regulation pole 252 is reduced, the developer may be partially deviated from both end portions of the developing sleeve 13-1 during a process in which the developer is transported from the catch pole 253 to the regulation pole 252. In this case, the amount of the developer finally transported to both end portions of the main pole 251 that faces the opening 120 is reduced, and thus an image dropout or image density decrease may occur at both end portions of a printed image. In view of this, the length and/or the diameter of the catch pole 253 and the length and/or the diameter of the regulation pole 252 may be differentially adjusted.

Figure 9:
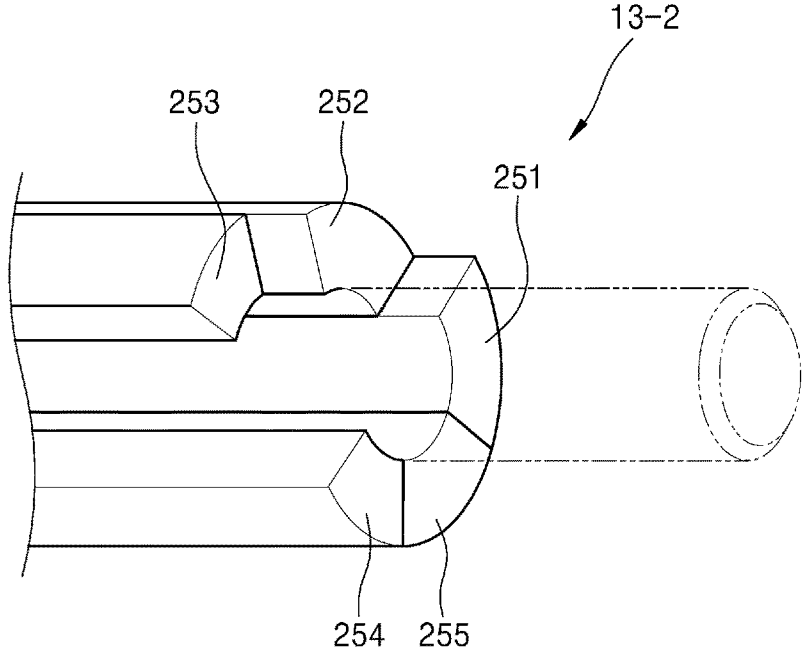
FIG. 9 is a partial perspective view of a magnetic member shown in FIG. 8 according to an example.

FIG. 9 is a partial perspective view of the magnetic member 13-2 shown in FIG. 8 according to an example. Referring to FIG. 9, the lengths of the catch pole 253 and the regulation pole 252 are less than the length of the main pole 251, and the length of the regulation pole 252 is greater than the length of the catch pole 253. According to the configuration of FIG. 9, the density of the developer at both end portions of the developing sleeve 13-1 may be reduced, thereby reducing or preventing local wear of both end portions of the photoconductor 14 and contaminations caused by the same, e.g., contamination of the cleaning member 17, contamination of the charging roller contamination of both end portions of the print medium P in the width direction, etc., may be reduced or prevented. Also, excessive reduction of the adhesion amount of the developer at both end portions of the regulation pole 252 and an image dropout or an image density decrease may be prevented.

Figure 10:
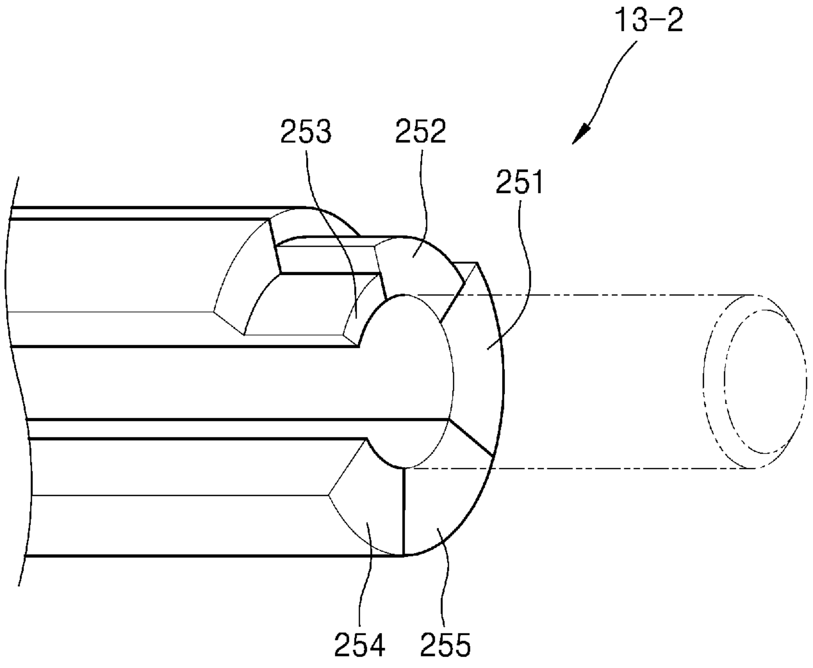
FIG. 10 is a partial perspective view of a magnetic member shown in FIG. 8 according to an example.

FIG. 10 is a partial perspective view of the magnetic member 13-2 shown in FIG. 8 according to an example. Referring to FIG. 10, the lengths of the catch pole 253 and the regulation pole 252 are the same as the length of the main pole 251. The diameters of both end portions of the catch pole 253 and the regulation pole 252 are less than the diameter of the main pole 251, and the diameter of both end portions of the regulation pole 252 is greater than the diameter of both end portions of the catch pole 253. According to the configuration of FIG. 10, the density of the developer at both end portions of the developing sleeve 13-1 may be reduced, thereby reducing or preventing local wear of both end portions of the photoconductor 14 and contaminations caused by the same, e.g., contamination of the cleaning member 17, contamination of the charging roller 15, contamination of both end portions of the print medium P in the width direction, etc., may be reduced or prevented. Also, excessive reduction of the adhesion amount of the developer at both end portions of the regulation pole 252 and an image dropout or an image density decrease may be prevented.

Figure 11:
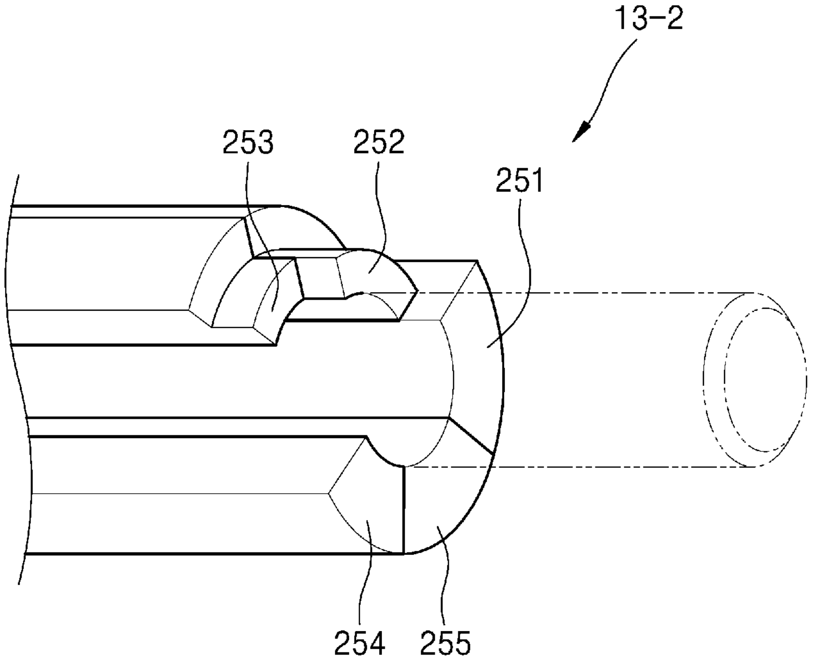
FIG. 11 is a partial perspective view of a magnetic member shown in FIG. 8 according to an example.

FIG. 11 is a partial perspective view of the magnetic member 13-2 shown in FIG. 8 according to an example. Referring to FIG. 11, the lengths of the catch pole 253 and the regulation pole 252 are less than the length of the main pole 251, and the length of the regulation pole 252 is greater than the length of the catch pole 253. The diameters of both end portions of the catch pole 253 and the regulation pole 252 are less than the diameter of the main pole 251. The diameter of both end portions of the regulation pole 252 may be the same as or greater than the diameter of both end portions of the catch pole 253. According to the configuration of FIG. 11, the density of the developer at both end portions of the developing sleeve 13-1 may be reduced, thereby reducing or preventing local wear of both end portions of the photoconductor 14 and contaminations caused by the same, e.g., contamination of the cleaning member 17, contamination of the charging roller 15, contamination of both end portions of the print medium P in the width direction, etc., may be reduced or prevented. Also, excessive reduction of the adhesion amount of the developer at both end portions of the regulation pole 252 and an image dropout or an image density decrease may be prevented.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A developing device comprising:

a developing container to store a developer and comprising an opening;

a developing sleeve installed in the developing container and partially exposed to an outside of the developing container through the opening;

a regulation member located upstream of the opening in a rotation direction of the developing sleeve, the regulation member to regulate an amount of the developer adhered to the developing sleeve and supplied to the opening; and a magnetic member located inside the developing sleeve and comprising a main pole facing the opening, a regulation pole facing the regulation member, and a catch pole located upstream of the regulation pole in the rotation direction of the developing sleeve, the catch pole to cause adhesion of the developer in the developing container to the developing sleeve, wherein:

at least one of a length of the catch pole or a length of the regulation pole is less than a length of the main pole, and at least one of diameters of end portions of the catch pole or diameters of end portions of the regulation pole are less than a diameter of the main pole.

2. The developing device of claim 1, wherein:

the length of the catch pole and the length of the regulation pole are less than the length of the main pole, or the diameters of the end portions of the catch pole and the diameters of the end portions of the regulation pole are less than the diameter of the main pole.

3. The developing device of claim 1, wherein:

the length of the catch pole and the length of the regulation pole are less than the length of the main pole, and the diameters of the end portions of the catch pole and the diameters of the end portions of the regulation pole are less than the diameter of the main pole.

4. The developing device of claim 1, wherein the lengths of the catch pole and the regulation pole are the same.

5. The developing device of claim 1, wherein an end portion of the regulation member that faces the developing sleeve is located below a center of the developing sleeve.

6. The developing device of claim 1, wherein an end portion of the regulation member that faces the developing sleeve is located above a center of the developing sleeve.

7. The developing device of claim 1, wherein the length of the regulation pole is greater than the length of the catch pole.

8. The developing device of claim 1, wherein the diameters of the end portions of the catch pole have shapes that gradually decrease.

9. The developing device of claim 1, wherein the diameters of the end portions of the regulation pole have shapes that gradually decrease.

10. The developing device of claim 1, wherein a surface of the developing sleeve comprises a concave-convex pattern, the length of the main pole is greater than a length of the concave-convex pattern, and the lengths of the catch pole and the regulation pole are less than the length of the concave-convex pattern.

11. An electrophotographic image forming apparatus comprising:

a developing device to form a toner image by supplying a developer to an electrostatic latent image formed on a photoconductor;

a transfer device to transfer the toner image to a print medium; and a fixing device to fix the toner image to the print medium, wherein the developing device comprises:

a developing container to store a developer and comprising an opening;

a developing sleeve installed in the developing container and partially exposed to an outside of the developing container through the opening;

a regulation member located upstream of the opening in a rotation direction of the developing sleeve, the regulation member to regulate an amount of the developer adhered to the developing sleeve and supplied to the opening; and a magnetic member located inside the developing sleeve and comprising a main pole facing the opening, a regulation pole facing the regulation member, and a catch pole located upstream of the regulation pole in the rotation direction of the developing sleeve, the catch pole to cause adhesion of the developer in the developing container to the developing sleeve, wherein:

at least one of a length of the catch pole or a length of the regulation pole is less than a length of the main pole, and at least one of diameters of both end portions of the catch pole or diameters of both end portions of the regulation pole are less than a diameter of the main pole.

12. The electrophotographic image forming apparatus of claim 11, wherein the regulation pole and the regulation member are to regulate a thickness of the developer as the developer passes between the developing sleeve and the regulation member.

13. The electrophotographic image forming apparatus of claim 11, wherein the lengths of the catch pole and the regulation pole are less than the length of the main pole.

14. A method comprising:

providing a developing container to store a developer and comprising an opening;

installing a developing sleeve in the developing container, the developing sleeve partially exposed to an outside of the developing container through the opening;

arranging a regulation member upstream of the opening in a rotation direction of the developing sleeve, the regulation member to regulate an amount of the developer adhered to the developing sleeve and supplied to the opening; and arranging a magnetic member inside the developing sleeve, the magnetic member comprising a main pole facing the opening, a regulation pole facing the regulation member, and a catch pole located upstream of the regulation pole in the rotation direction of the developing sleeve, the catch pole to cause adhesion of the developer in the developing container to the developing sleeve, wherein:

at least one of a length of the catch pole or a length of the regulation pole is less than a length of the main pole, and at least one of diameters of end portions of the catch pole or diameters of end portions of the regulation pole are less than a diameter of the main pole.

* * * * *